US011159612B1

(12) United States Patent
Puttagunta et al.

(10) Patent No.: US 11,159,612 B1
(45) Date of Patent: Oct. 26, 2021

(54) DETERMINING NON-TDP ZONES IN A STORAGE AREA NETWORK

(71) Applicant: Hewlett Packard Enterprise Development LP, Houston, TX (US)

(72) Inventors: Krishna Babu Puttagunta, Rocklin, CA (US); Rupin Tashi Mohan, Northborough, MA (US); Alice Terumi Clark, Northborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/860,389

(22) Filed: Apr. 28, 2020

(51) Int. Cl.
*H04L 12/931* (2013.01)
*H04L 29/08* (2006.01)
*H04L 12/26* (2006.01)

(52) U.S. Cl.
CPC .......... *H04L 67/1063* (2013.01); *H04L 43/10* (2013.01); *H04L 49/356* (2013.01); *H04L 67/1065* (2013.01); *H04L 67/1097* (2013.01)

(58) Field of Classification Search
CPC ... H04L 43/10; H04L 49/356; H04L 67/1063; H04L 67/1065; H04L 67/1097; H04L 45/02; H04L 49/351; G06F 11/1479; G06F 12/0815; G06F 16/953; G06F 3/061; G06F 3/0635; G06F 3/0647; G06F 3/0673
See application file for complete search history.

(56) References Cited

U.S. PATENT DOCUMENTS

| | | |
|---|---|---|
| 6,597,656 B1 | 7/2003 | Blanc et al. |
| 7,904,599 B1 | 3/2011 | Bennett |
| 7,958,282 B2 | 6/2011 | Odenwald et al. |
| 7,990,994 B1 | 8/2011 | Yeh et al. |
| 7,996,509 B2 | 8/2011 | Basham et al. |
| 8,599,864 B2 | 12/2013 | Chung et al. |
| 8,806,150 B2 | 8/2014 | Nakajima |
| 8,930,537 B2 | 1/2015 | Basham et al. |
| 9,009,311 B2 | 4/2015 | Myrah et al. |
| 9,229,645 B2 | 1/2016 | Nakajima |
| 10,148,483 B1 * | 12/2018 | Lippitt ................ H04L 67/1097 |
| 2003/0131051 A1 | 7/2003 | Lection et al. |

(Continued)

FOREIGN PATENT DOCUMENTS

| | | |
|---|---|---|
| CN | 101933014 A | 12/2010 |
| CN | 103092657 A | 5/2013 |

(Continued)

OTHER PUBLICATIONS

Erik Smith, "Brass Tracks: Introducing Target Driven Zoning (TDZ)", available online at <https://brasstacksblog.typepad.com/brass-tacks/2012/01/introducing-target-driven-zoning-tdz.html>, Jan. 16, 2012, 9 pages.

(Continued)

*Primary Examiner* — Le H Luu
(74) *Attorney, Agent, or Firm* — Hewlett Packard Enterprise Patent Department

(57) ABSTRACT

Examples include determination of non-TDP zones in a storage area network. Some examples use a member zone list request to request identification of each zone of which a target port of a target device is a member, identify each TDP zone among identified zones of which a target port is a member and determine whether the identified zones include one or more non-TDP zones.

20 Claims, 4 Drawing Sheets

(56) References Cited

U.S. PATENT DOCUMENTS

| | | |
|---|---|---|
| 2005/0025075 A1 | 2/2005 | Dutt et al. |
| 2009/0168772 A1 | 7/2009 | Dropps et al. |
| 2009/0222733 A1 | 9/2009 | Basham et al. |
| 2010/0077408 A1 | 3/2010 | Forte et al. |
| 2012/0254554 A1 | 10/2012 | Nakajima |
| 2013/0024639 A1* | 1/2013 | Yamamoto ............ G06F 3/0635 711/165 |
| 2013/0262811 A1 | 10/2013 | Taguchi |
| 2013/0332614 A1 | 12/2013 | Brunk et al. |
| 2014/0372721 A1 | 12/2014 | Nakajima |
| 2015/0324126 A1* | 11/2015 | Nakajima ............ G06F 3/0647 711/114 |
| 2016/0087841 A1 | 3/2016 | Bharadwaj et al. |
| 2017/0023271 A1 | 1/2017 | Nabeshima et al. |
| 2017/0250990 A1* | 8/2017 | Puttagunta ............ H04L 49/351 |
| 2018/0210796 A1* | 7/2018 | Lalsangi ............. G06F 11/1479 |
| 2018/0219755 A1* | 8/2018 | Agarwal ............. H04L 67/1097 |
| 2019/0020603 A1 | 1/2019 | Subramani et al. |
| 2020/0252319 A1* | 8/2020 | Specht .................... H04L 45/02 |
| 2020/0257546 A1* | 8/2020 | Chou ..................... G06F 3/061 |
| 2021/0019092 A1* | 1/2021 | LeCrone .............. G06F 3/0673 |
| 2021/0037096 A1* | 2/2021 | Scharland .......... G06F 12/0815 |
| 2021/0058342 A1* | 2/2021 | McBrearty ............ G06F 16/953 |

FOREIGN PATENT DOCUMENTS

| | | |
|---|---|---|
| CN | 105321108 A | 2/2016 |
| CN | 105404701 A | 3/2016 |

OTHER PUBLICATIONS

Master001A, "Brocade Zone Deletion from effective config", available online at <https://www.dell.com/community/Connectrix/Brocade-Zone-Deletion-from-effective-config/td-p/7001507>, Dell Technologies, Apr. 18, 2014, 7 pages.

Nigel Poulton, "Anyone for Target Driven Zoning", available online at <https://web.archive.org/web/20181026023900/http://blog.nigelpoulton.com/anyone-for-target-driven-zoning/>, May 9, 2013, 3 pages.

Vandecruys et al., "Smart Zoning", available online at <https://www.cisco.com/c/en/us/support/docs/storage-networking/zoning/116390-technote-smartzoning-00.html>, Cisco, Aug. 5, 2013, 3 pages.

Datacore Software, "Host Configuration Guide," (Research Paper), VMware ESXi, SANsymphony-V, Jun. 2015, pp. 1-40.

EMC2, "EMC Powerpath Load Balancing and Failover," White Paper, Feb. 2011, pp. 1-28.

International Search Report & Written Opinion received in PCT Application No. PCT/US2015/043245, dated May 30, 2016, 13 pages.

International Search Report & Written Opinion received in PCT Application No. PCT/US2016/029990, dated Jan. 26, 2017, 10 pages.

Netapp, Inc., "Clustered Data Ontap® 8.2," Network Management Guide, May 8, 2013, pp. 1-109.

Ralph O. Weber, "Principal/Peers Zoning in FC-GS-7", ENDL, Texas, Jan. 27, 2011, 13 pages.

Wikipedia, "Software versioning", available online at <https://en.wikipedia.org/w/index.php?title=Software_versioning&oldid=706254171>, Feb. 22, 2016, 14 pages.

Wikipedia, "Version control", available online at <https://en.wikipedia.org/w/index.php?title=Version_control&oldid=709871737>, Mar. 13, 2016, 10 pages.

Wikipedia, "Versioning file system", available online at <https://en.wikipedia.org/w/index.php?title=Versioning_file_system&oldid=694519694>, Dec. 9, 2015, 5 pages.

American National Standard for Information Technology, "Fibre Channel—Generic Services—8 (FC-GS-8)", Apr. 10, 2019, 429 pages.

* cited by examiner

DETERMINING NON-TDP ZONES IN A STORAGE AREA NETWORK

BACKGROUND

Storage networks such as storage area networks (SANs) are high performance networks that provide access and connectivity to storage devices to store and retrieve information. For instance, a SAN enables a computing device to access information stored in a storage device.

BRIEF DESCRIPTION OF THE DRAWINGS

The following detailed description references the drawings, wherein.

DETAILED DESCRIPTION

Figure 1:
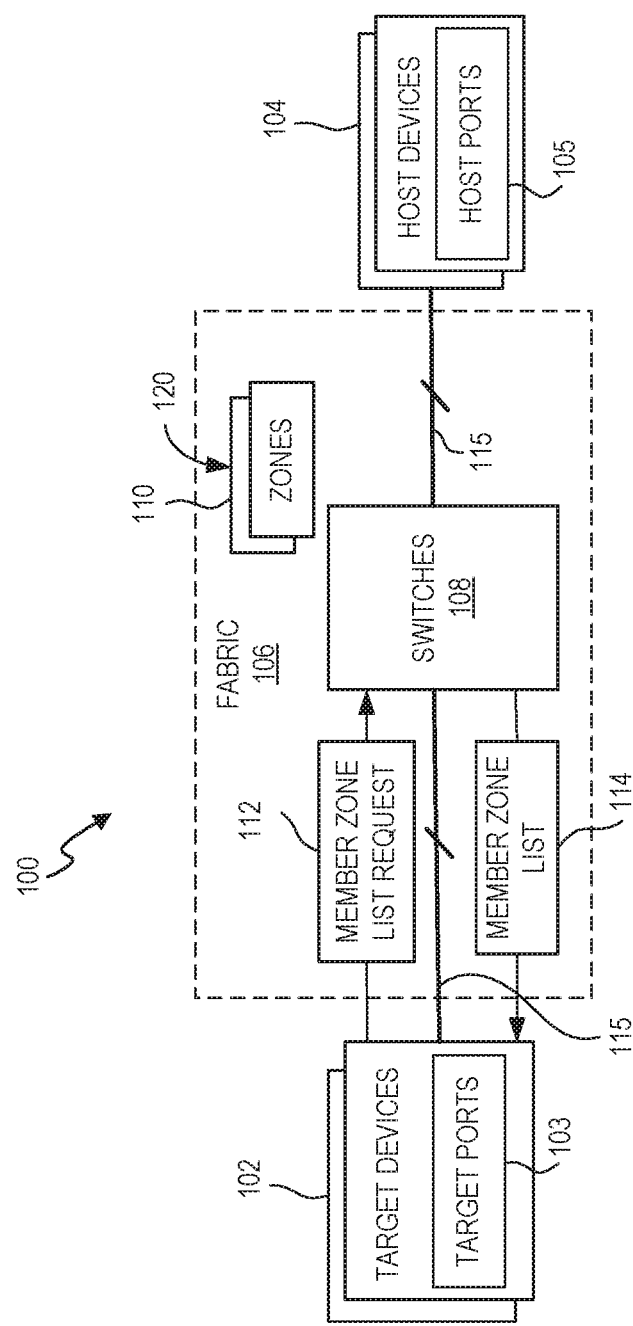
FIG. 1 is a block diagram of an example storage area network (SAN) including a plurality of target devices connected to a plurality of host devices through a fabric.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two as or more than two. The term "another," as used herein, is defined as at least a second or more. The term "connected," as used herein, is defined as coupled or associated, whether directly without any intervening elements or indirectly with at least one intervening element, unless otherwise indicated. Two elements can be connected mechanically, electrically, or communicatively linked through a communication channel, pathway, network, or system. The term "and/or" as used herein refers to and encompasses any and all possible combinations of the associated listed items. The term "based on" means based at least in part on. It will also be understood that, although the terms first, second, third, etc. may be used herein to describe various elements, these elements should not be limited by these terms, as these terms are only used to distinguish one element from another unless stated otherwise or the context indicates otherwise.

As described, a storage area network (SANs) may be a dedicated network used to provide data connections for data transfer between target devices and host devices. In particular, the SAN may enable access and connectivity among the target devices and the host devices. A target device, as used herein, may refer to a storage device such as a storage array or disk array, for storing information or data and having a processing resource for processing the data. Storage capacity of a storage device may be presented as one or more virtual volumes or "LUNs" (where LUN stands for logical unit number). In an example, the storage array may be a data storage system that contains multiple storage drives for block-based storage, file-based storage or object storage. A storage drive may be a hard disk drive (HDD), a solid state drive (SSD), or any other suitable type of storage drive, and may be a SAS drive (e.g., a SAS HDD, a SAS SSD, etc.), a Serial AT Attachment (SATA) drive (e.g., SATA HDD), or the like. A host device, as used herein, may refer to a computing device that may start a process of accessing data stored in one or more target devices and/or a process of storing data in the one or more target devices. In an example, the host device may be a server providing data services to a plurality of clients based on the data stored at one or more of the target devices. Each data service can, for instance, relate to a separate application, for which a service level agreement exists.

In some examples, multiple target devices (e.g., storage arrays) may be presented to multiple host devices (e.g., servers) over a fabric. As used herein, the term "fabric" may refer to a communication system (e.g., network) to connect one or more target devices to communicate with a plurality of host devices either directly or via at least one switch (e.g., of a SAN). The fabric may facilitate the host devices to store data to and access the stored data in the target devices. In some examples, the fabric may include one or more switches that enable the host devices to communicate with target devices. Multiple switches may be present in a fabric, and the number of switches may depend on the size of the fabric. In some examples, some switches may be present in the fabric for redundancy and high availability. As used herein, a "switch" may refer to an expander, or other device or component including a plurality of link interfaces and capable of routing communications received on one link interface of a fabric to another link interface of the fabric. A variety of storage protocols may be used to establish communication over the fabric. Some examples of suitable communication protocols may include Fibre Channel (FC), Internet Small Computer Systems Interface (iSCSI), and Fiber Channel over Ethernet (FCoE).

In some examples, a zoning mechanism may be used to define "zones", which may be groups of one or more target devices (e.g., by including target port(s) of the one or more target devices) and one or more host devices (e.g., by including target port(s) of the one or more target devices) in a fabric. In some examples, zones may be defined to implement access control (e.g., for security purposes). In particular, a zone may be defined to include one or more target ports of the one or more target devices and one or more host ports of the one or more host devices. In some examples, zones may be defined based on predetermined zoning rules. Zoning may segregate target port(s) and host port(s) into respective zones to restrict access between target port(s) and host port(s) that are members of (i.e., included in) the same zone. Accordingly, zoning may prevent unauthorized access between target port(s) and host port(s) that are not members of the same zone.

Several zoning techniques may be used to orchestrate or configure zones in a fabric according to respective zoning rules. For example, zoning may employ techniques where a single host port may be zoned with (i.e., placed in the same zone as) many target ports, or where a single host port is zoned with a single target port, which may result in a large number of zones. In some examples, a peer zoning technique may be employed to configure zones (also referred to as "peer zones"). In peer zoning, each zone may include a set of target port(s) and host port(s), where each target port and each host port may have a "principal member" role in the zone or a "peer member" role in the zone. Within a peer zone, principal member(s) may communicate with peer members, while peer members cannot communicate with one another. In such examples, switches may act as intermediary devices to facilitate communication between target port(s) and host port(s), and enforce the zoning rules. Further, the switches may know the respective states of the target port(s) and host port(s). In an example, the switches can be responsible for communicating state changes to the target port(s) and host port(s), which have requested state change notifications, dependent on the zoning rules.

With peer zoning, a target port having a principal member role can communicate with a plurality of host ports having peer member roles, which means that the host ports cannot communicate with one another. This feature of access restriction among peer members (in this case the host ports) can shield the peer members from excessive notifications when the state of a host port changes. In peer zoning, one practice may be to have one principal member (i.e., a target port) in a zone. Though peer zoning, in general, permits multiple principal members, one practice may employ one principal member (i.e., a target port) and multiple peer member (i.e., host ports) in a zone (e.g., for security reasons as well as for effective utilization of hardware resources).

In an example, one or more zones may be configured to conform to a particular set of zoning rules. In some examples, zone(s) may be configured by an administrator (e.g., an authorized user) or by a component of the fabric (e.g., a switch, a host or a target) authorized to manage and/or configure zones. In some examples, a zone may be orchestrated or configured using an out-of-band zoning technique relative to the fabric (e.g., using channels other than the communication channels for communication between target port(s) and host port(s) over the fabric). For example, out-of-band zoning techniques may use a switch/ fabric command line interface (CLI), a graphical user interface (GUI), third party external SAN management tools/ orchestrators, or the like. However, these zoning techniques may be complex and error-prone.

In some examples, peer zoning may be facilitated by a target device using an in-band zoning technique relative to the fabric (e.g., a technique using the communication channels for communication between target port(s) and host port(s) over the fabric). In some examples, an in-band zoning technique may be implemented by automated target-orchestrated peer zoning, which may be referred to as a target-driven peer (TDP) zoning technique. According to the TDP zoning technique, a target device may automatically facilitate zone creation, and a zone so created may be referred to as target-driven peer zone (or TDP zone). In an example, a target device may facilitate configuration of a zone (i.e., a TDP zone) including a target port of the target device and at least one host port of the host device(s). In some examples, the target device may configure multiple TDP zones including a single target port. In such examples, the target port may be a member (e.g., a principal member) of multiple TDP zones. In some examples, a TDP zoning technique may be more efficient and less error-prone zoning technique as compared to other zoning techniques, such as out-of-band zoning techniques.

In some examples, a fabric may include some zone(s) configured using the TDP zoning technique, such zones referred to herein as "TDP" zone(s), and other zone(s) configured using a zoning technique other than the TDP zoning technique, such zones referred to herein as "non-TDP" zone(s). In an example, the non-TDP zone(s) may be configured using an out-of-band zoning technique as discussed above. As an example, an existing fabric may include some pre-configured non-TDP zone(s). Over time, the existing fabric may generate some TDP zone(s). In such instances, the fabric may include both non-TDP zone(s) and TDP zone(s), and may have non-uniform zone configuration. It may be desirable to have uniform zone configuration in the fabric so that the fabric may be managed uniformly (e.g., using a single control pane, interface, tool, or the like). In an example, it may be desirable to have all TDP zones in the fabric. However, determining non-TDP zones among various zones or, in some examples, segregating TDP zones and non-TDP zones in the fabric may be a challenge.

Examples described herein provide techniques to determine whether a fabric, in a SAN, that includes one or more TDP zones, includes any non-TDP zone. In order to determine whether the fabric includes any non-TDP zone, the techniques may determine whether each target port of each target device in the fabric, is a member of any non-TDP zone. Some examples described herein may provide systems and methods to determine whether a target port is a member of one or more non-TDP zones. In the examples described herein, a target port may determine one or more non-TDP zones among the zones of which the target port is a member, by identifying each TDP zone among the zones. Thus, the described systems and methods may segregate TDP zone(s) and non-TDP zone(s) among the zones of which the target port is a member. The methods for determining whether a target port is a member of one or more non-TDP zones, may be repeated for each target port in the fabric to determine whether the fabric includes non-TDP zone(s). In some examples, the described systems and methods may further determine each member (i.e., host port) of each determined non-TDP zone. On determining each host port that is a member of a determined non-TDP zone, the host port(s) may be added to an existing TDP zone or a new TDP zone. In such examples, each non-TDP zone may be, in effect, converted to one or more TDP zones. In this manner, examples described herein may provide systems and methods that may help in achieving uniform zone configuration in the fabric that may be managed uniformly (e.g., via a single control pane).

Examples are further described herein with reference to FIGS. 1-5. It should be noted that the description and figures merely illustrate the principles of the present subject matter along with examples described herein, and should not be construed as limiting the present subject matter. Various arrangements may be devised that, although not explicitly described or shown herein, embody the principles of the present subject matter. Moreover, all statements herein reciting principles, aspects, and examples of the present subject matter, as well as specific examples thereof, are intended to encompass equivalents thereof.

Although examples may be described herein with reference to one target port, examples may be utilized for several target ports of multiple target devices. Furthermore, any functionality described herein as performed by a component of a fabric, a target device or a host device may be performed by at least one processing resource of the component executing instructions (stored on a machine-readable storage medium) to perform the functionality described herein. Various implementations of the present subject matter have been described below by referring to several examples.

FIG. 1 is a block diagram of an example storage area network (SAN) 100. The SAN 100 may include a plurality of target devices 102 (e.g., storage arrays) and a plurality of host devices 104 (e.g., servers) connected (e.g., communicatively connected) to the plurality of target devices 102 using a fabric 106. The fabric 106 may include to a network 115 that allows most or all of the host devices 104 to communicate with the target devices 102 through one or more switches 108. A switch may be deployed to exchange data between a host device and a target device connected through that switch. A number of switches 108 in the fabric 106 may depend on the size of SAN 100 for redundancy and high availability. In examples where the fabric 106 includes multiple switches, the switches may be connected to one another and share information available at each switch with one another.

The network 115 may be a wireless network, a wired network, or a combination thereof. In the examples described herein, the network 115 may include, for example, a local area network (LAN), a virtual LAN (VLAN), a wireless local area network (WLAN), a virtual private network (VPN), a wide area network (WAN), the Internet, or the like. The network 115 may either be a dedicated network or a shared network, which represents an association of the different types of networks that use a variety of communication protocols. The variety of communication protocols may be used to establish communication between the host devices 104 and the target devices 102. Some examples of suitable communication protocols may include Fibre Channel (FC), Ethernet, Internet Small Computer Systems Interface (iSCSI), HyperSCSI, and Fiber Channel over Ethernet (FCoE).

Examples of host devices 104 may each include, without limitation, a server, a desktop computer, a notebook computer, a tablet computer, a thin client, a mobile device, and the like. As used herein, the term "server" may include a computer and/or a computer program (machine-readable instructions) that may process requests from other (client) computers over a network.

Target devices 102 may each be a storage device or appliance (e.g., a storage array), storage software, or any combination thereof. A storage device may be an internal storage device, an external storage device, or a network attached storage device. Other examples of the storage devices may include any type of storage device described above. In other examples, the storage device may comprise a Direct Attached Storage (DAS) device, a Redundant Array of Inexpensive Disks (RAID), a data archival storage system, or a block-based device accessible over a storage area network (SAN). In one example, the storage device may be a storage array, which may include one or more storage drives, as described above.

Each target device 102 may include at least one target port 103 and each host device 104 may include at least one host port 105. In an example, a target device 102 via a target port 103 may initiate a connection over the fabric 106 to a host port 105 on a host device 104. As described herein, a target device 102 connected to a host device 104 may mean that the at least one target port 103 of the target device 102 may be communicatively connected to the at least one host port 105 of the host device 104 through one of the one or more switches 108. In some examples, a target port 103 of a target device 102 may be connected to multiple host ports of one or more host devices 104.

In some examples, zoning may be implemented in the SAN 100. Through zoning, target ports 103 of target devices 102 and host ports 105 of host devices 104 in the SAN 100 may be divided into logical groups over the physical configuration of the fabric 106. In examples described herein, multiple zones 110 may be defined among the target ports 103 of the target devices 102 and the host ports 105 of the host devices 104. In an example, each zone 110 may be configured by grouping a target port 103 with at least one host port 105. In some examples, a zone of the zones 110 may be configured by grouping a target port 103 with multiple host ports 105. The multiple host ports 105 in a zone 110 may belong to one or more host devices 104. Moreover, in the examples described herein, each target port 103 and each host port 105 may belong to one or more zones (i.e., a member of one or more zones) of the zones 110.

Figure 2A:
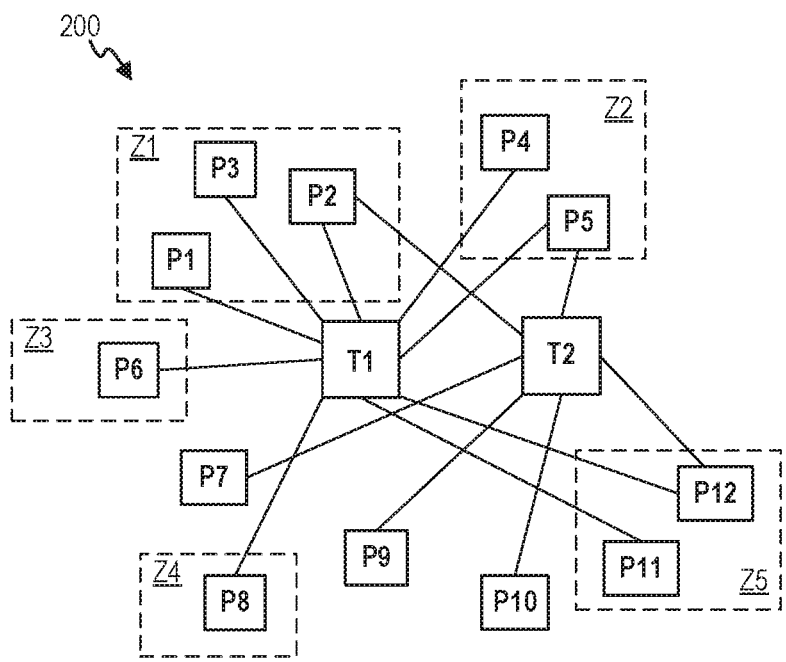
FIGS. 2A-2B schematically represent example network topologies of at least a portion of the SAN in FIG. 1.

In this manner, the components of the SAN 100 (i.e., the target ports 103 of the target devices 102, the host ports 105 of the host devices 104 and the one or more switches 108 in the fabric 106) may be arranged in a network topology to define the multiple zones 110. As used herein, the term "network topology" refers to a geometrical/structural representation of the arrangement of various components in a network e.g., the SAN 100. FIG. 2A schematically represents a network topology 200 of at least a portion of the SAN 100 of FIG. 1, in an example. In this example, two target ports 103, labelled as target ports T1 and T2 in FIGS. 2A-2B, may each be connected to at least one host port 105 of the host ports 105, labelled as host ports P1-P12 in FIGS. 2A-2B. The target ports T1 and T2 may belong to a same target device or different target devices 102, and host ports P1-P12 may belong to a same host device or different host devices 104. The target ports T1 and T2 may each be connected to at least one host port of the host ports P1-P12, via the fabric 106 (i.e., through the one or more switches 108). As illustrated, the target port T1 may be a member of five zones Z1-Z5, as shown by the connection of target port T1 to respective host ports in each of zones Z1-Z5. Network topology 200 may include the five zones Z1-Z5 that include target port T1 as a member. In some examples, network topology 200 may further include one or more zones that include the target port T2 as a member and not target port T1. For clarity, such zones are not shown in FIGS. 2A and 2B.

As described above, the target port T1 may be a member of each of the zones Z1-Z5. In each of the zones Z1-Z5, the target port T1 may be connected to at least one host port of the host ports P1-P12. For example, as illustrated, in zone Z1, the target port T1 may be connected to the host ports P1, P2, P3; in zone Z2, the target port T1 may be connected to the host ports P4, P5; in zone Z3, the target port T1 may be connected to a host port P6; in zone Z4, the target port T1 may be connected to a host port P8; and in zone 5, the target port T1 may be connected to the host ports P11, P12. Each host port illustrated in one of zones Z1-Z5 may be referred to as a member or "host members" of that zone. Though FIG. 2A shows various zones and respective host members, the network topology 200, including the zones Z1-Z5 and their respective host members, may not be known to a user. Zones Z1-Z5 of FIG. 2A may be examples of zones included in zones 110 of FIG. 1.

Referring again to FIG. 1, one or more of zones 110 in the SAN 100 may be configured using the TDP zoning technique and one or more of zones 110 may be configured using a zoning technique other than the TDP zoning technique. Accordingly, the zones 110 may include one or more TDP zones and one or more non-TDP zones. As noted, in a TDP zone, a target port that is a member of the TDP zone may act as a principal member and at least one host port that is a member of the TDP zone may act as a peer member. In some other examples, each zone of the zones 110 in the SAN 100 may be a TDP zone. In these examples, the SAN 100 may not include any non-TDP zone.

Although the SAN 100 may include a plurality of target ports 103 connected to host ports 105 through one or more switches 108, for clarity of description, examples may be described below in relation to one target port 103 connected to at least one host port 105 of a host device 104 through one switch 108. Further, in examples where the fabric 106 includes multiple switches, the switches may be connected with one another and may know various details of the fabric 106 including the details of zones 110, the states of target port(s) 103 of target device(s) 102 and the states of host port(s) 105 of host device(s) 104.

In the examples described herein, components (e.g., target port 103, target device 102, switch 108, host device 104, and host port 105) of the SAN 100 may communicate with each other to perform several functionalities as described herein. Functionalities described herein as performed by a component (e.g., target port 103, target device 102, switch 108, host device 104, or host port 105) of the SAN 100, may be performed by at least one processing resource executing instructions to perform those functionalities or by electronic circuitry.

FIG. 1 shows communication exchange between the target port 103 and a switch 108. In the examples described herein, the target port 103 may send a member zone list request 112 to the switch 108. In examples described herein, a member zone list request may be a request for identification of zones of which the requesting target port is a member, exclusively. That is, a member zone list request may request identification of only those zones of which the target port that sent the request is a member (i.e., and not of any zones of which that target port is not a member). In examples described herein, a switch 108 that receives a member zone list request 112 from a given target port may, in response to the member zone list request, provide identification exclusively of zones of which the given target port is a member. In some examples, the identification may be provided in the form of a member zone list 114 including identification of each zone of which the given target port is a member, and not including identification of any zone of which the given target port is not a member. In an example, the member zone list 114 may include a list of zone identifiers exclusively for (e.g., identifying or otherwise corresponding to) the zones of which the given target port is a member. In response to a member zone list request 112 from a given target port 103, the switch 108 may provide a member zone list 114, in response, to the given target port 103. In some examples, zones 120 may be a subset of zones 110, wherein the given target port 103 is a member of each of zones 120, exclusively, among the plurality of zones 110. In such examples, the member zone list 114 may include a list of zone identifiers identifying, exclusively, each of zones 120 (of which the given target port 103 is a member).

As used herein, the term "zone identifier" may refer to information useable to identify a zone. A zone identifier may be any type of identifier, and may be generated for a zone when the zone is created, in some examples. In an example, a zone identifier of a zone may include a name, a custom defined label (e.g., a prefix) or a combination thereof, that may be generated while creating the zone. For example, a TDP zone may include a prefix "tdp_".

In some examples, the identified zones 120 may include one or more TDP zones. The target port 103 may identify each TDP zone among the identified zones 120. In some examples, the target port 103 may identify each TDP zone based on the content of the zone identifiers included in the member zone list 114. For example, each zone identifier corresponding to a TDP zone may include a prefix "tdp_" and may be identified corresponding to the prefix "tdp_" from the member zone list 114. In other examples, the target port 103 may identify each TDP zone among the identified zones 120 based on a TDP zone list stored at the target port 103. A TDP zone list of a target port may be a list of one or more zone identifiers for each TDP zone that includes the target port as a member (i.e., principal member in this case). The TDP zone list may be stored at a target port of a corresponding target device and updated while or immediately after the creation of any TDP zone that includes the target port as a principal member. In the examples as described herein, the TDP zone list of the target port 103 may include zone identifiers (i.e., TDP zone identifiers) for each TDP zone that includes the target port 103 as a member. In an example, the TDP zone list of the target port 103 may be separate from the member zone list 114. In the examples described herein, each TDP zone may be identified by comparing the TDP zone list and the member zone list 114. In such examples, target port 103 may determine that each zone identifier in the member zone list 114 that matches a zone identifier in the TDP zone list of the target port 103 is an identifier for a TDP zone among the identified zones 120.

On identifying the zone identifiers for each TDP zone from the member zone list 114, the target port 103 may identify whether the member zone list 114 includes any zone identifier that does not correspond to a TDP zone, such as a remaining zone identifier of the member zone list 114 that did not match any identifier in the TDP zone list of the target port 103. Such a zone identifier may correspond to a non-TDP zone. In some examples, the target port 103 may identify one or more zone identifiers corresponding to non-TDP zone(s). Accordingly, in such examples, the identified zones 120 (of which the target port 103 is a member) may include one or more TDP zones and one or more non-TDP zones. In some other examples, the target port 103 may not identify any zone identifier, from the member zone list 114, that does not correspond to a TDP zone, while or after identifying zone identifiers for each TDP zone. In such examples, the identified zones 120 may not include any non-TDP zone.

In response to determining that the identified zones 120 include one or more non-TDP zones, the target port 103 may send, to the switch 108, a request for identification of each member of each determined non-TDP zone. A port list request may be sent to a switch to provide a port list including identification of each port that is a member of a given zone. In the examples described herein, a port list request may be sent, by the target port 103, to the switch 108, requesting, for each determined non-TDP zone that includes the target port 103 as a member, a port list of each port that is a member of the determined non-TDP zone. In some examples, target port 103 may provide an individual port list request to switch 108 to provide an individual port list of each member of a determined non-TDP zone, for each of the determined non-TDP zones. In an example, the port list may include identification (e.g., a host port identifier) of at least one host port that is a member of a determined non-TDP zone. In an example, the identification of a host port may be a World Wide Name (WWN) which uniquely identifies that host port. In some examples, the port list may include identification (e.g., a host port identifier) of multiple host ports that may be members of a determined non-TDP zone. In this manner, the switch 108 may identify each host port that is a member of each determined non-TDP zone.

In some examples, each host port that is a member of a determined non-TDP zone, and that is identified by the switch 108, may be added to a TDP zone that includes the target port 103 as a principal member. The addition of the host port(s) to a TDP zone may be performed by the target device 102 that includes the target port 103. In an example, a host port identified by the switch 108 may be added to one of the one or more identified TDP zones that include the target port 103 as a principal member (i.e., an existing TDP zone). In another example, a host port identified by the switch 108 may be added to a new TDP zone that includes the target port 103 as a principal member. In such instances, the creation of a new TDP zone may be performed by the target device 102 that includes the target port 103. In this manner, each host port that is a member of a determined non-TDP zone may be added to a TDP zone (e.g., an existed TDP zone or a new TDP zone). In other words, each determined non-TDP zone may be converted to a TDP zone. In some examples, after adding each host port of a determined non-TDP zone to a TDP zone, the determined non-TDP zone may be removed from the fabric 106.

Functionalities described herein as performed by a target port may be performed by at least one processing resource executing instructions to perform those functionalities or by electronic circuitry. Functionalities described herein as performed by a switch may be performed by at least one processing resource executing instructions to perform those functionalities or by electronic circuitry. Other functionalities described herein may be performed by either one of a target port or a switch.

Referring again to FIG. 2A, in an example, the target port T1 may send a member zone list request to a switch connected to the target port T1. A member zone list 114 for the target port T1 may include zone identifiers for zones Z1-Z5. In an example, the target port T1 may identify two TDP zones Z1 and Z2 based on the content of the zone identifiers of zones Z1 and Z2 in the member zone list 114. In response to identifying the TDP zones Z1 and Z2, the target port T1 may determine that the three remaining zone identifiers in the member zone list 114, which may correspond to the zones Z3, Z4 and Z5, are non-TDP zones Z3, Z4, and Z5, as listed in Table 1 below.

Figure 2B:
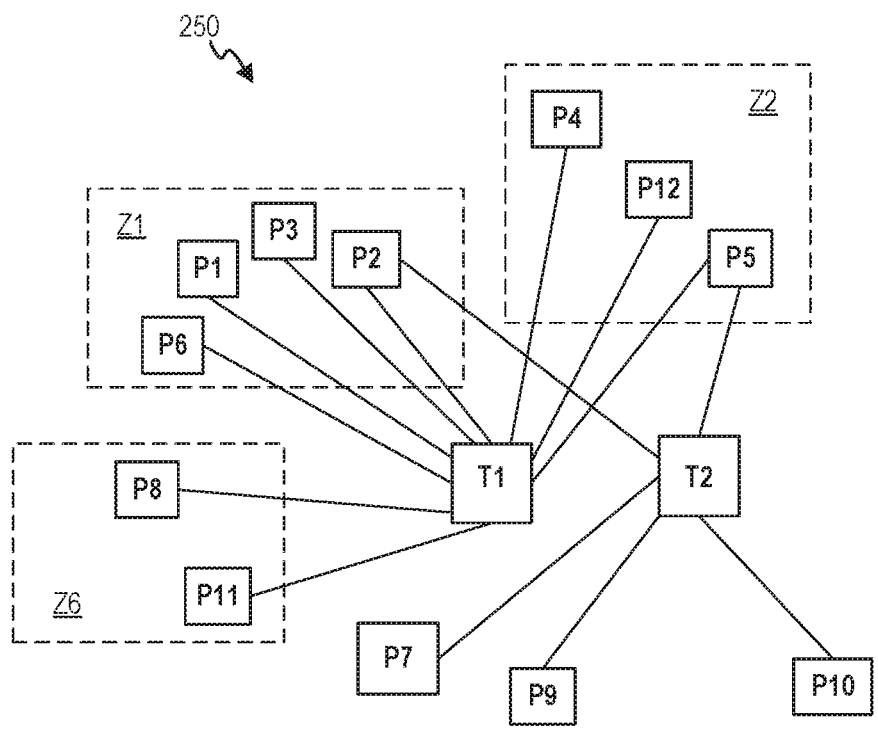

The target port T1 may further send request, individually, to the switch for identification of each member (i.e., host port) of each of the determined non-TDP zones Z3, Z4, and Z5. In response, the switch may provide a port list including host port identifier(s) of each host port that is a member of any of the determined non-TDP zones Z3, Z4, and Z5. That is, the target port T1 may determine that host port P6 is a member of the non-TDP zone Z3, host port P8 is a member of the non-TDP zone Z4, and host ports P11 and P12 are members of the non-TDP zone Z5 (Table 1). Each of these host ports P6, P8, P11, and P12 may be added to any of existing TDP zones Z1 or Z2 or one or more new TDP zones of which the target port T1 may be a principal member. The non-TDP zones Z3, Z4 and Z5 may be removed from the fabric 106. In other words, the non-TDP zones Z3, Z4, and Z5 may be converted to or incorporated into TDP zones (i.e., Z1, Z2, one or more new TDP zones, or the like). FIG. 2B shows network topology 250 of the at least a portion of SAN 100 (as shown in FIG. 2A) after the non-TDP zones Z3, Z4 and Z5 are removed. In this example, the host port P6 is added to zone Z1; the host port P12 may be added to zone Z2; and the host ports P8 and P11 are added to a new TDP zone Z6. Similarly, one or more other non-TDP zones corresponding to other target ports (e.g., the target port T2) of the plurality of target ports may be determined and converted to TDP zones to achieve uniform zone configuration in the fabric 106.

TABLE 1

| TDP Zone(s) | Non-TDP Zones | Host members corresponding to non-TDP zones | Zones removed |
|---|---|---|---|
| Z1, Z2 | Z3, Z4, Z5 | P6, P8, P11, P12 | Z3, Z4, Z5 |

Figure 3:
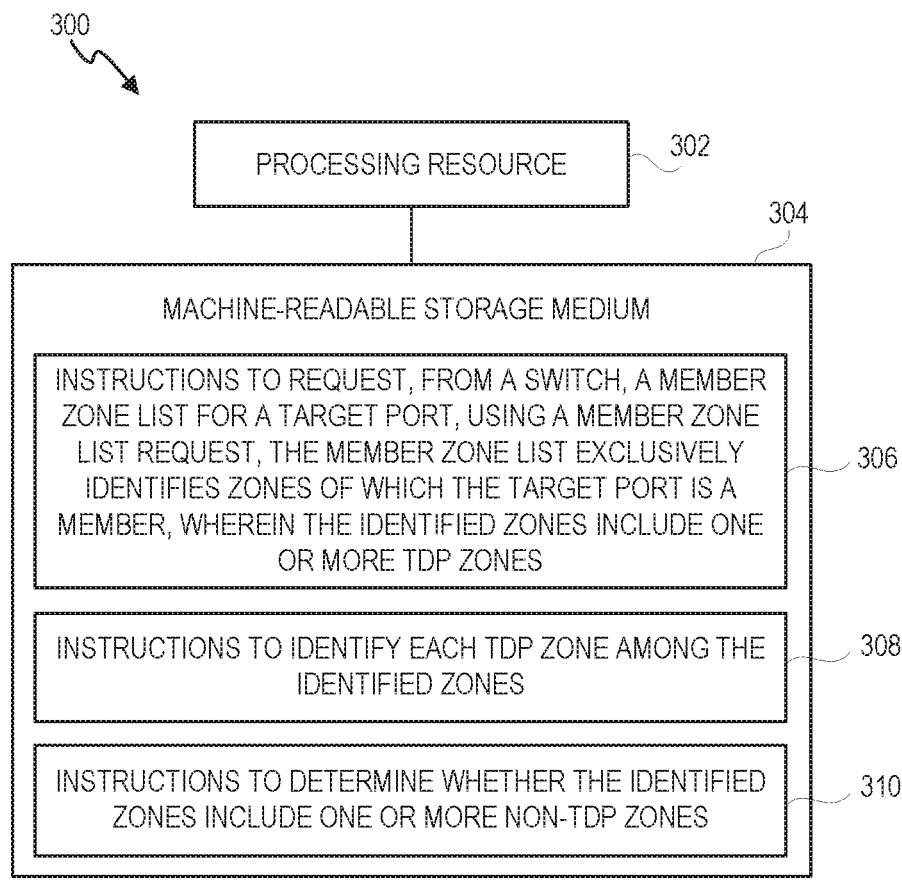
FIG. 3 is a block diagram depicting a processing resource and a machine-readable storage medium encoded with example instructions to determine whether a fabric includes one or more non-TDP zones of which a target port of a target device is a member, in accordance with an example.

FIG. 3 is a block diagram 300 depicting a processing resource 302 and a machine readable medium 304 encoded with example instructions 306, 308 and 310 to determine whether a target port (e.g., the target port 103 of FIG. 1) is a member of one or more non-TDP zones in a fabric (e.g., the fabric 106 in SAN 100 of FIG. 1) and thereby to determine whether the fabric includes one or more non-TDP zone, in accordance with an example. Non-limiting examples of the processing resource 302 may include a microcontroller, a microprocessor, central processing unit core(s), an application-specific integrated circuit (ASIC), a field programmable gate array (FPGA), etc. The machine readable medium 304 may be a non-transitory storage medium, examples of which include, but are not limited to, a random access memory (RAM), a read-only memory (ROM), an electrically erasable programmable read-only memory (EEPROM), a flash memory, a hard disk drive, etc.

In some examples, the machine readable medium 304 may be accessed by the processing resource 302. The processing resource 302 may execute instructions (i.e., programming or software code) stored on the machine readable medium 304. The instructions 306, 308 and 310 of FIG. 3, when executed by the processing resource 302, may implement various aspects of determining whether a target port is a member of one or more non-TDP zone in a fabric. In some examples, the processing resource 302 and the machine readable medium 304 may be included in (e.g., as part of) a target device of which the target port is a member. In some examples, the processing resource 302 and the machine readable medium 304 may be included in (e.g., as part of) a target port (e.g., the target port 103 of a target device 102) of FIG. 1. For ease of illustration, the FIG. 3 will be described with reference to FIG. 1. In certain examples, the instructions 306-310 may be executed for performing the functionalities of the target port 103 and one or more methods, such as, the methods 400 and 500 described in FIGS. 4 and 5. In certain examples, as an alternative or in addition to executing the instructions 306-310, the processing resource 302 may include at least one IC, other control logic, other electronic circuitry, or combinations thereof that include a number of electronic components for performing the functionalities described herein as being performed by a target port 103.

The instructions 306, when executed by the processing resource 302, may request, from the switch 108, a member zone list 114 for the target port 103 using the member zone list request 112 (described previously). In response to the member zone list request 112, the switch 108 may provide identification, exclusively, of zones of which the target port 103 is a member. In some examples, the identification may be provided in the form of the member zone list 114 including identification of each zone of which the target port 103 is a member, and not including identification of any zone of which the target port 103 is not a member. In an example, the member zone list 114 may include a list of zone identifiers exclusively for (e.g., identifying or otherwise corresponding to) the zones of which the target port 103 is a member. In some examples, zones 120 may be a subset of zones 110, wherein the target port 103 is a member of each of zones 120, exclusively, among the plurality of zones 110. In such examples, the member zone list 114 may include a list of zone identifiers identifying, exclusively, each of zones 120 (of which the target port 103 is a member).

The instructions 308, when executed by the processing resource 302, may identify each TDP zone among the identified zones 120. In some examples, each TDP zone may be identified among the identified zones 120 based on the content of zone identifiers in the member zone list 114. In other examples, each TDP zone may be identified among the identified zones 120 based on the TDP zone list (described previously) stored at the target port 103. The instructions 310, when executed by the processing resource 302, may determine whether the identified zones 120 includes one or more non-TDP zones. In the examples as described herein, a zone identifier in the member zone list 114 that does not correspond to a TDP zone may be identified while identifying the zone identifier for each TDP zone from the member zone list 114. Such a zone identifier may correspond to a non-TDP zone. In some examples, the identified zones 120 may include one or more non-TDP zones. In other examples, the identified zones 120 may not include any non-TDP zone.

The instructions 306-310 may include various instructions to execute at least a part of the methods described in FIGS. 4-5 (described later). Also, although not shown in FIG. 3, the machine readable medium 304 may also include additional program instructions to perform various other method blocks described in FIGS. 4-5.

Figure 4:
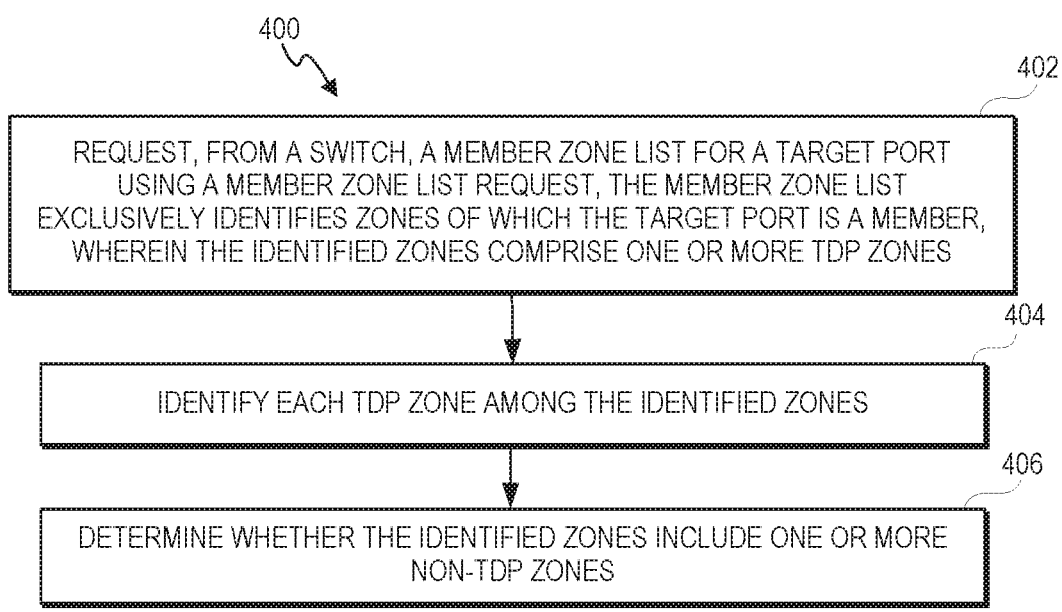
FIG. 4 is a flowchart of an example method for determining whether a fabric includes one or more non-TDP zones of which a target port of a target device is a member.

FIG. 4 depicts a flowchart of an example method 400 for determining whether a target port (e.g., the target port 103 of the target device 102) is a member of one or more non-TDP zones in a fabric (e.g., the fabric 106 of FIG. 1), in some examples. FIG. 5 depicts a flowchart of an example method 500 for determining whether a target port (e.g., the target port 103 of the target device 102) is a member of one or more non-TDP zones in a fabric (e.g., the fabric 106 of FIG. 1) and converting the determined non-TDP zone(s) to a TDP zone for achieving uniform zone configuration in the fabric, in some examples.

For ease of illustration, the execution of methods 400 and 500 are described in details below with reference to FIG. 1. Although the below description is described with reference to the target port 103 of the target device 102 of FIG. 1, however other target ports of the same target device or different target devices or other applications or devices suitable for the execution of methods 400 and 500 may be utilized. In some examples, the methods 400 and 500 may, individually, be repeated for each target port present in the SAN 100 to determine whether the fabric 106 includes one or more non-TDP zones. Additionally, implementation of methods 400 and 500 is not limited to such examples. Although the flowcharts of FIGS. 4-5, individually, show a specific order of performance of certain functionalities, methods 400 and 500 are not limited to such order. For example, the functionalities shown in succession in the flowcharts may be performed in a different order, may be executed concurrently or with partial concurrence, or a combination thereof.

In FIG. 4, at block 402, the method 400 may include requesting from the switch 108 a member zone list 114, for the target port 103, using a member zone list request 112 (described previously). In an example, the target port 103 may request, from the switch 108, identification of only those zones of which the target port 103 is a member (i.e., and not of any zones of which the target port 103 is not a member). In response to the member zone list request 112, the switch 108 may provide identification exclusively of zones of which the target port 103 is a member. In some examples, the identification may be provided in the form of the member zone list 114 including identification of each zone of which the target port 103 is a member, and not including identification of any zone of which the target port 103 is not a member. In an example, the member zone list 114 may include a list of zone identifiers exclusively for (e.g., identifying or otherwise corresponding to) the zones of which the target port 103 is a member. In some examples, zones 120 may be a subset of zones 110, wherein the given target port 103 is a member of each of zones 120, exclusively, among the plurality of zones 110. In such examples, the member zone list 114 may include a list of zone identifiers identifying, exclusively, each of zones 120 (of which the target port 103 is a member).

At block 404, the method 400 may include identifying each TDP zone among the identified zones 120 included in the member zone list 114. In an example, each TDP zone may be identified by the target port 103 (which is a member of each TDP zone). In some examples, each TDP zone may be identified based on the content of zone identifiers included in the member zone list 114. In such examples, each TDP zone may be identified by identifying each TDP zone identifiers by their names, custom defined labels (e.g., prefixes) or combinations thereof. In some examples, each TDP zone may be identified based on the TDP zone list (described previously) stored at the target port 103. The process of identifying each TDP zone among the identified zones 120 based on the TDP zone list may be described previously.

At block 406, the method 400 may include determining whether the identified zones 120 may comprise one or more non-TDP zones. On identifying (at block 404) the zone identifiers for each TDP zone from the member zone list 114, the target port 103 may identify (at block 406) whether the member zone list 114 includes any zone identifier that does not correspond to a TDP zone. In an example, the target port 103 may identify any remaining zone identifier of the member zone list 114 that did not match any identifier in the TDP zone list of the target port 103. Such a zone identifier may correspond to a non-TDP zone. In some examples, the target port 103 may not identify any zone identifier, from the member zone list 114, that does not correspond to a TDP zone. That is, the identified zones 120 may not include any non-TDP zone. In such examples, the fabric 106 may not include any non-TDP zone that includes the target port 103 as a member. In some examples, the target port 103 may identify one or more zone identifiers corresponding to non-TDP zone(s). In such examples, the identified zones 120 may include one or more non-TDP zones. Accordingly, in these examples, the fabric 106 may include one or more non-TDP zones that include the target port 103 as a member.

Figure 5:
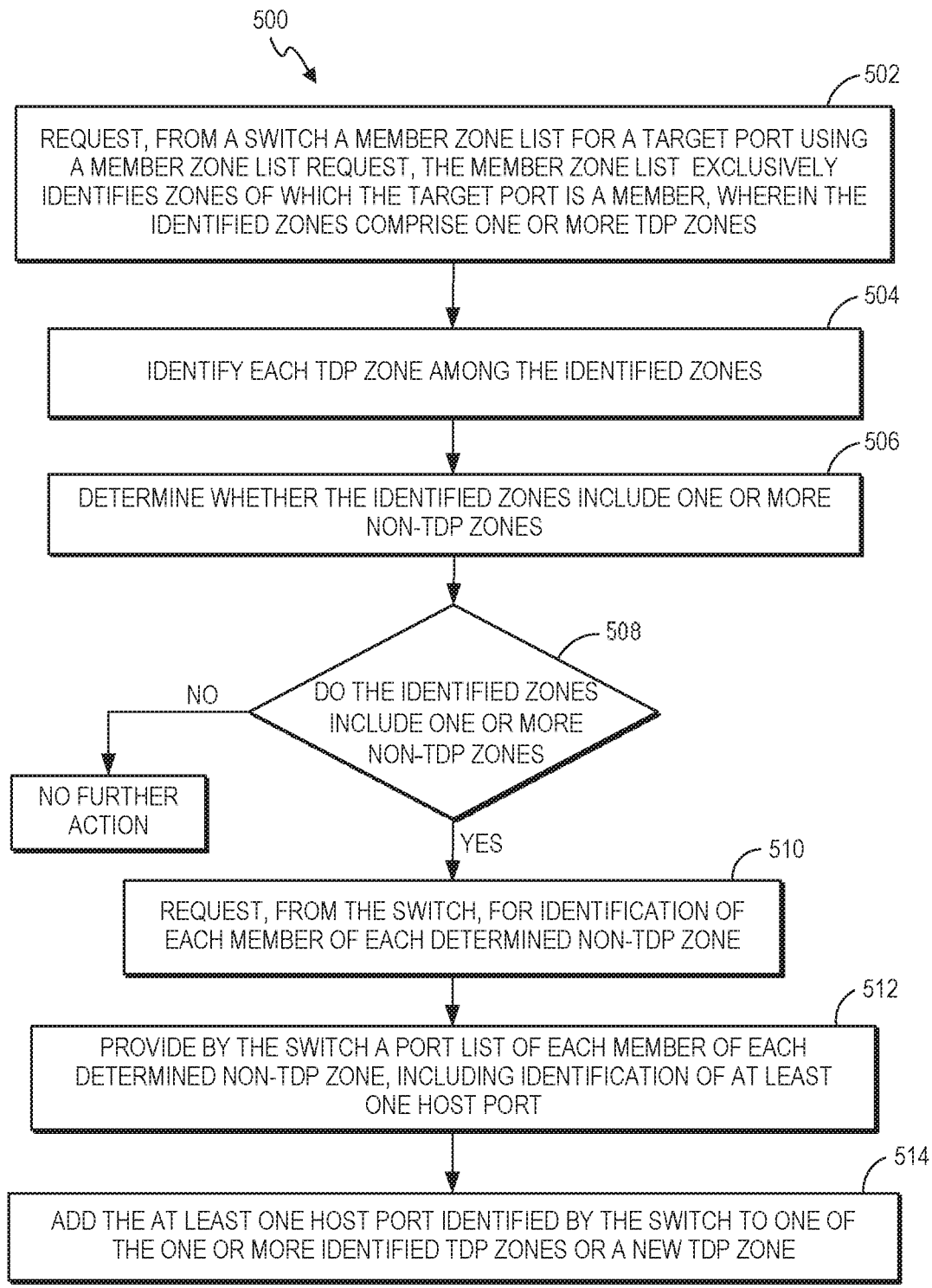
FIG. 5 is a flowchart of an example method for achieving uniform zone configuration in a fabric.

Turning now to FIG. 5, a flow diagram depicting a detailed method 500 for achieving uniform zone configuration in a fabric e.g., the fabric 106 of the SAN 100 in FIG. 1 is presented, in accordance with some examples. The method 500 is described in conjunction with FIG. 1. Although the below description is described with reference to the target port 103 of a target device 102 of FIG. 1, however the method 500 may be repeated for each target port present in the SAN 100 to determine whether the fabric 106 includes one or more non-TDP zones. Also, method steps at various blocks depicted in FIG. 5 may be performed by the target port 103. In some examples, method 500 at each such method blocks may be executed by the processing resource 302 by executing the instructions 306-310 stored in the non-transitory machine-readable storage medium 304. Further, the method 500 of FIG. 5 includes certain blocks that are similar to one or more blocks described in FIG. 4, details of which are not repeated herein for the sake of brevity. By way of example, the blocks 502, 504, 506 of FIG. 5 are similar to blocks 402, 404, 406, respectively, of FIG. 4.

At block 502, the method 500 may include requesting from the switch 108 a member zone list 114, for the target port 103, using a member zone list request 112 (described previously). In response to the member zone list request 112, the switch 108 may provide the member zone list 114 that may include a list of zone identifiers exclusively for (e.g., identifying or otherwise corresponding to) the zones of which the target port 103 is a member. In some examples, the member zone list 114 may include a list of zone identifiers identifying, exclusively, each of zones 120 of which the target port 103 is a member.

At block 504, the method 500 may include identifying each TDP zone among the identified zones 120 included in the member zone list 114. In an example, each TDP zone may be identified by the target port 103 (which is a member of each TDP zone). At block 506, the method 500 may include determining whether the identified zones 120 may comprise one or more non-TDP zones. In some examples, the identified zones 120 may not include any non-TDP zone ('NO' at block 508). In such example, the fabric 106 may not include any non-TDP zone of which the target port 103 is a member. In such instances, no further action may be required with reference to the target port 103. In some examples, the identified zones 120 may include one or more non-TDP zones ('YES' at block 508). In such example, the fabric 106 may include one or more non-TDP zones of which the target port 103 is a member.

At block 510, the method 500 may include requesting, from the switch 108, for identification of each member of each determined non-TDP zone. In an example, a port list request (described previously) may be provided by the target port 103 to the switch 108, requesting, for each determined non-TDP zone that includes the target port 103 as a member, a port list of each port that is a member of the determined non-TDP zone. In some examples, target port 103 may provide an individual port list request to the switch 108 to provide an individual port list of each member of a determined non-TDP zone, for each of the determined non-TDP zones. In an example, the port list may include identification (e.g., a host port identifier) of at least one host port that is a member of a determined non-TDP zone. In an example, the identification of a host port may be a World Wide Name (WWN) which uniquely identifies that host port. In some examples, the port list may include identification (e.g., a host port identifier) of multiple host ports that may be members of a determined non-TDP zone. In this manner, the switch 108 may identify each host port that is a member of each determined non-TDP zone.

At block 512, the method 500 may include adding each host port that is a member of a determined non-TDP zone, and that is identified by the switch 108, to a TDP zone. In an example, each host port may be added to a TDP zone that includes the target port 103 as a member. In an example, the addition of host port(s) to a TDP zone may be performed by the target device 102 that includes the target port 103. In some examples, a host port identified by the switch 108 may be added to one of the one or more identified TDP zones that include the target port 103 as a principal member (i.e., an existing TDP zone). In some examples, each host port identified by the switch 108 may be added to a new TDP zone that includes the target port 103 as a principal member.

In some examples, multiple host ports may be identified by the switch 108 that may be members of the determined non-TDP zone. In such instances, each host port may be added to one of the one or more TDP zones or one or more new TDP zones. The method 500 may then include removing the determined one or more non-TDP zones from the fabric 106. The method 500 may be repeated for each target port in the fabric 106 to determine whether the fabric 106 includes one or more non-TDP zones, and in response that the fabric 106 includes the one or more non-TDP zones, convert each determined non-TDP zone to a TDP zone (as described above). After converting each determined non-TDP zone to a TDP zone and removing each determined non-TDP zone, the fabric 106 may contain all TDP zones, and have uniform zone configuration.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

The invention claimed is:

1. A storage area network comprising:
a target device comprising a target port to send a member zone list request to a switch;
the switch to provide a member zone list to the target port in response to the member zone list request, the member zone list exclusively identifying zones of which the target port is a member, wherein:
each of the identified zones comprises at least one host port of a host device; and
the identified zones comprise one or more target-driven peer (TDP) zones; and
wherein the target port is to identify each TDP zone among the identified zones and determine whether the identified zones comprise one or more non-TDP zones.

2. The storage area network of claim 1, wherein the target port is to identify each TDP zone based on the content of zone identifiers included in the member zone list.

3. The storage area network of claim 1, wherein the target port is to identify each TDP zone based on a TDP zone list stored at the target port.

4. The storage area network of claim 3, wherein the TDP zone list comprises a list of one or more zone identifiers, including one for each TDP zone that includes the target port as a member.

5. The storage area network of claim 1, wherein, in response to determining that the identified zones comprise the one or more non-TDP zones, the target port is to send, to the switch, a request for identification of each member of each determined non-TDP zone.

6. The storage area network of claim 5, wherein:
in response of the request for identification of each member of each determined non-TDP zone, the switch to provide a port list of each member of each determined non-TDP zone, including identification of at least one host port.

7. The storage area network of claim 6, wherein the at least one host port identified by the switch is added to one of the one or more identified TDP zones.

8. The storage area network of claim 6, wherein the target port is to add the at least one host port identified by the switch to a new TDP zone that includes the target port as a member.

9. A non-transitory machine readable medium containing a set of instructions executable by at least one processing resource to:
request, from a switch, a member zone list for a target port of a target device using a member zone list request, the member zone list exclusively identifying zones of which the target port is a member, wherein:
each of the identified zones comprises at least one host port of a host device; and
the identified zones comprise one or more TDP zones;
identify each TDP zone among the identified zones; and
determine whether the identified zones comprise one or more non-TDP zones.

10. The machine readable medium of claim 9, wherein the instructions to identify each TDP zone comprises instructions to identify each TDP zone based on the content of zone identifiers included in the member zone list.

11. The machine readable medium of claim 9, wherein the instructions to identify each TDP zone comprise instructions to identify each TDP zone based on a TDP zone list stored at the target port.

12. The machine readable medium of claim 9, further comprising instructions executable by the at least one processing resource to:
in response to determining that the identified zones comprise the one or more non-TDP zones, request, from the switch, for identification of each member of each determined non-TDP zone; and
in response to the request, provided, by the switch, a port list of each member of each determined non-TDP zone, including identification of at least one host port.

13. The machine readable medium of claim 12, further comprising instructions executable by the at least one processing resource to add the at least one host port identified by the switch to one of the one or more identified TDP zones.

14. The machine readable medium of claim 13, further comprising instructions executable by the at least one processing resource to add the at least one host port identified by the switch to a new TDP zone that includes the target port as a member.

15. A method comprising:
with a target port of a target device, requesting, from a switch, a member zone list for the target port using a member zone list request, the member zone list exclusively identifying zones of which the target port is a member, wherein:
each of the identified zones comprises at least one host port of a host device; and
the identified zones comprise one or more TDP zones;
identifying, by the target port, each TDP zone among the identified zones; and
determining, by the target port, whether the identified zones comprise one or more non-TDP zones.

16. The method of claim 15, wherein identifying each TDP zone comprises identifying each TDP zone based on the content of zone identifiers included in the member zone list.

17. The method of claim 15, wherein identifying each TDP zone comprises identifying each TDP zone based on a TDP zone list stored at the target port.

18. The method of claim 15, wherein
in response to determining that the identified zones comprise the one or more non-TDP zones, requesting, from the switch, for identification of each member of each determined non-TDP zone.

19. The method of claim 18, further comprising
in response to requesting, providing, by the switch, a port list of each member of each determined non-TDP zone, including identification of at least one host port.

20. The method of claim 19, further comprising adding, by the target port, the at least one host port identified by the switch to one of the one or more identified TDP zones or a new TDP zone.

* * * * *